United States Patent [19]
Holder et al.

[11] Patent Number: 5,715,458
[45] Date of Patent: Feb. 3, 1998

[54] INCORPORATION OF SERVICES WRITTEN IN ONE OPERATING SYSTEM ENVIRONMENT INTO ANOTHER OPERATING SYSTEM ENVIRONMENT

[75] Inventors: Karl-Hans Holder, Sindelfingen; Ingolf Salm, Gaeufelden; Otto Weiss, Steinenbronn, all of Germany

[73] Assignee: International Business Machines Corporation, Armonk, N.Y.

[21] Appl. No.: 387,526

[22] Filed: Feb. 13, 1995

[30] Foreign Application Priority Data

Feb. 14, 1994 [EP] European Pat. Off. .............. 94102225

[51] Int. Cl.$^6$ .................. G06F 9/00; G06F 9/40; G06F 9/44; G06F 9/46
[52] U.S. Cl. .......................................................... 395/680
[58] Field of Search .................. 395/700, 701, 395/703, 705, 706, 650, 375, 417, 416, 418, 680

[56] References Cited

U.S. PATENT DOCUMENTS

| | | | |
|---|---|---|---|
| 3,805,247 | 4/1974 | Zucker et al. | 395/375 |
| 3,825,726 | 7/1974 | Dorr et al. | 235/435 |
| 4,399,504 | 8/1983 | Obermarck et al. | 395/650 |
| 4,584,639 | 4/1986 | Hardy | 395/650 |
| 4,742,447 | 5/1988 | Duvall et al. | 395/375 |
| 4,812,975 | 3/1989 | Adachi et al. | 395/500 |
| 4,833,594 | 5/1989 | Familetti et al. | 395/700 |
| 4,885,884 | 12/1989 | Austin et al. | 395/650 |
| 4,922,414 | 5/1990 | Holloway et al. | 395/417 |
| 5,032,987 | 7/1991 | Broder et al. | 395/421.11 |
| 5,038,281 | 8/1991 | Peters | 395/700 |
| 5,325,526 | 6/1994 | Cameron et al. | 395/650 |
| 5,374,932 | 12/1994 | Wyschogrod et al. | 342/36 |
| 5,471,816 | 12/1995 | Amatsu et al. | 395/200.03 |
| 5,481,684 | 1/1996 | Richter et al. | 395/388 |

FOREIGN PATENT DOCUMENTS

| | | | |
|---|---|---|---|
| 0 093 267 | 11/1983 | European Pat. Off. | G06F 9/46 |
| 0 197 552 | 10/1986 | European Pat. Off. | G06F 9/44 |
| 0 315 493 | 5/1989 | European Pat. Off. | G06F 9/44 |
| 0 317 478 | 5/1989 | European Pat. Off. | G06F 9/44 |
| 0 372 835 | 6/1990 | European Pat. Off. | G06F 9/45 |
| 8807718 | 10/1988 | WIPO . | |

OTHER PUBLICATIONS

IBM, "Enterprise Systems Architecture/390, Principles of Operation, SA22–7201–00, Second Edition" IBM Corporation, Poughkeepsie, NY, Mar. 1993.

(List continued on next page.)

*Primary Examiner*—Alvin E. Oberley
*Assistant Examiner*—Peter J. Corcoran, III
*Attorney, Agent, or Firm*—William A. Kinnaman, Jr.

[57] ABSTRACT

Data processing apparatus comprises a processor and memory. The processor has a supervisor state including a first set of supervisor service routines for controlling the operation of the data processing apparatus. The memory has a first hash table accessible by the supervisor state for pointing to the first set of supervisor service routines and a second hash table also accessible by the supervisor state for pointing to a second set of supervisor service routines. The data processing apparatus provides table indicating means for indicating whether the first hash table or the second hash table is accessible by the supervisor state. The table indicating means is provided as an index into the first hash table. When this index is accessed, further code is executed which allows access to the second hash table. The operation of the data processing apparatus is controlled by a routine comprising the steps of testing to determine which hash table is to be used for calling the routine, using the determined hash table to find the address in the memory at which the code representing the called routine is resident, and executing the routine in the processor. In one embodiment of the invention, the first step comprises testing the operating system environment in the processor. The invention finds particular use in providing in a first operating system environment, such as MVS/ESA™, services written for a second operating system environment, such as VSE/ESA™.

10 Claims, 5 Drawing Sheets

OTHER PUBLICATIONS

IBM, "Enterprise Systems Architecture/390, Principles of Operation, SA22-7201-00," IBM Corporation, Poughkeepsie, NY, Oct. 1, 1991.

Groves, R.D., "Improved Definition for Supervisor Calls in a RISC Processor," IBM Tech. Disc. Bull., vol. 32, No. 4B, pp. 116–117, Sep. 1989.

Broussard, S.J., "Method for Developing High–Level Programming Interface Capabilities," IBM Tech. Disc. Bull., vol. 34, No. 8, pp. 107–110, Jan. 1992.

Gries, David, "Compiler Construction for Digital Computers", John Wiley & Sons, Inc., 1971, New York, pp. 216–224.

INCORPORATION OF SERVICES WRITTEN IN ONE OPERATING SYSTEM ENVIRONMENT INTO ANOTHER OPERATING SYSTEM ENVIRONMENT

BACKGROUND OF THE INVENTION

1. Field of the Invention

The invention relates to a data processing apparatus comprising a processor and memory, wherein the processor in operation has a supervisor state including a first set of one or more routines for controlling the operation of the data processing apparatus, and the memory in operation has a first hash table accessible by the supervisor state for pointing to the first set of one or more routines.

2. Description of the Related Art

An operating system for a computer is a collection of software programs which controls the execution of application programs on the computer. An operating system typically provides services such as resource allocation, scheduling, input/output control and data management. In the modern data processing world, a variety of operating systems are known. Examples of operating systems include the UNIX™ operating system which operates on a variety of different hardware platforms, the MS-DOS™ operating system which was developed for the IBM Personal Computer and the VMS™ operating system which runs on the VAX™ series of computers produced by the Digital Equipment Corporation.

The IBM System/390™ (S/390™) Architecture is the most widely used hardware architecture for mainframe computers. It is a development of the System/360™ Architecture which was introduced in the early 1960s as the first hardware architecture for general purpose computers. At least four different operating systems have been programmed for running on the IBM S/390 architecture: VM/ESA™, MVS/ESA™, AIX/ESA™ and VSE/ESA™. Each of these operating systems has its own strengths and weaknesses, essentially due to the different markets for which they were developed. Despite their differences, the operating systems all perform the same tasks and there is an increasing tendency for them to all offer the same functions. For example, the recently introduced MVS/ESA operating system recently offered users access to a hardware facility for compressing their data and such a facility will be introduced in future versions of the VSE/ESA operating system. The S/390 architecture is described in the IBM Manual SA22-7201-00 entitled *Principles of Operation* and published by the IBM Corporation (first edition in October 1990).

The introduction of new features and functions into the operating systems requires a substantial amount of new programming work. Not only does the code need to be written but it must be tested as realistically as possible. Thus it would make sense to write code which would readily run under all operating systems with minor modifications. The code could be developed under one operating system and then readily "ported" to other operating systems or other computer hardware. The users of the other operating systems could then benefit from the new functions or features provided to the users of the first operating system. Whilst a certain amount of testing of the code will be required in the other operating systems, much of the code testing will have been carried out during the original development work and thus time and person-years of effort will be saved.

Developments of operating systems in this direction have in general led to the design of new types of operating systems with a so-called kernel architecture. In this operating system design a "kernel" of code is developed for each hardware platform on which the operating system is to be run. The kernel provides a standard set of interfaces for every hardware platform. Common functional programs for the operating system can be programmed in exactly the same way for every hardware platform. Such an approach was adopted by the Microsoft Corporation for the development of the Windows NT™ operating system and is being used by the Taligent co-operation between IBM, Apple and Hewlett-Packard for the object-oriented PINK operating system.

Whilst the kernel operating system structure is ideal for totally new operating systems, it does not allow itself to be adapted to existing operating systems such as MVS/ESA or VSE/ESA as mentioned above. It is also not possible for the existing operating systems to be scrapped in favour of newer software architectures since there is a substantial amount of customer investment in applications programs running under the existing operating systems and the customers are generally reluctant to change operating systems without gaining substantial advantages.

One of the limitations to the adaptation of older operating systems to today's needs has been the limit to the number of operating system services which can be simultaneously called. In the IBM S/390 architecture, each operating system service (also known as supervisor services) is allocated an entry in a hash table, termed the SVC table, which indicates the address in memory at which the code performing the service is to be found. However, there are only a limited number of entries in the table and thus only a limited number of services can be programmed.

The article entitled "Improved Definition for Supervisor Calls" published in the *IBM Technical Disclosure Bulletin*, Vol. 32, No. 4B, September 1989, pp. 116–117, offers one solution to the limited number of entries in the SVC table. In the solution offered there, the operating system services are called by the use of a supervisor call (SVC) instruction. However, the interruption codes associated with the SVC instruction are allocated dynamically rather than being fixed, as is known from prior art operating systems such as VSE/ESA. A special location within the supervisor storage maintains a link between the interruption code, the operating system service offered and the location of the code for the operating system service within memory.

Again this design of operating system will allow the code from operating system services to be readily ported from one operating system to another. However, it does not allow itself to be adapted to the addition of operating system services to existing operating systems in which the interruption codes to the services are fixed and are not dynamically variable.

For example, if one wished to produce code for an operating system service which functioned in all operating systems, one would need to determine an interruption code which was free in the SVC tables of all the operating systems on which it was desired to run the operating system service.

Other solutions to the problem of providing new operating system services common to many other operating systems are known from EPO Patent Publications 93,267 (IBM), 197,552 (Microsoft), 315,493 (Visisystems), 317,478 (IBM) and 372,835 (IBM) and from the *IBM Technical Disclosure Bulletin*, Vol. 34, No. 8, January 1992, pp. 107–110 in an article entitled "Method for Developing High-Level Programming Interface Capabilities". However, all of these have disadvantages similar to those described above, require several intermediate steps or are not directly accessible to the applications programmer.

It is therefore the object of this invention to provide an apparatus and method for calling a routine providing an operating system service in an operating system different from the operating system in which the code for the routine was originally programmed.

SUMMARY OF THE INVENTION

This object is achieved by the memory in operation having a second hash table accessible by the supervisor state for pointing to a second set of one or more routines and the data processing apparatus providing table indicating means for indicating whether the first hash table or the second hash table is accessible by the supervisor state.

Using the table indicating means, a second hash table, or supervisor call (SVC) table, may be accessed. A programmer developing supervisor service routines for the operating system therefore is able to access supervisor service routines developed for another operating system without substantial amount of reprogramming. In addition, the provision of the table indicating means allows the development of supervisor services which can be used in a multiple number of operating systems independently of the existing supervisor call tables. It is only necessary for each of the existing supervisor call tables to have an entry allowing access to the newly-developed hash table with entries pointing to the common supervisor call services. Furthermore, the invention allows the number of supervisor call services accessible to the operating system to be substantially expanded since an access method and apparatus to another hash (SVC) table is provided which provides access to the additional services.

In an embodiment of the invention, the table indicating means is an index into the first hash table. Such an arrangement has the advantage in that no substantial reprogramming of the operating system is required. A free entry in the first hash table is used to access a routine which then accesses the second hash table pointing to the second set of routines. The first set of routines can accordingly be accessed as known in the prior art and only when access to the second set of routines is required is it necessary to execute additional code.

In a further embodiment of the invention, the assembler for assembling a program entered in the computer is provided with a macro facility. The macro facility has one or more macro libraries associated with it which contain lines of code for controlling the table indicating means. The use of a macro with the lines of code for controlling the table indicating means allows the easy use by the programmer of the invention since he or she is able to call a macro to implement the invention. In the assembler, the macro is expanded with the necessary instruction statements to control the table indicating means.

The object of the invention is also solved by a method for calling a routine for controlling the operation of a data processing apparatus including a processor and a memory wherein the data processing system has at least two hash tables for accessing the routines, the method comprising the steps of testing to determine which hash table is to be used for calling the routine; using the determined hash table to find the address in the memory at which the code representing the called routine is resident; and executing the routine in the processor.

In an embodiment of the invention, the second step of the method comprises the substeps of accessing a first one of the hash tables by means of an index determined in the first step of testing and executing a routine associated with that index. The routine is either one of a first set of routines or a routine responsible for accessing a second one of the hash tables and executing a routine accessible from the second one of the hash tables.

According to a further embodiment of the invention, the determined index is either set by a parameter of the value of the instruction in the executing program when the first step of the inventive method indicates that the operating system environment is a first operating system environment or is set to a value when the first step indicates that the operating system environment is a second operating system environment. In the latter case, the second one of the hash tables is accessed by an index set by a parameter of the instruction in the executing program.

The invention as described herein is used for providing in a first operating system services written for a second operating system environment. It is particular suitable for adapting supervisor services written in the IBM MVS/ESA operating system environment to the VSE/ESA operating system environment.

DETAILED DESCRIPTION OF THE INVENTION

A computer can understand and interpret only machine language which is in binary form and thus very difficult to write. Assembler language is a symbolic programming language that allows the programmer to code instructions instead of coding directly in machine language. Because the assembler language allows the programmer to use meaningful symbols made up of alphabetic and numeric characters instead of merely the binary digits 0 and 1 used in machine language, it can make coding easier to read, understand and change.

Figure 1:
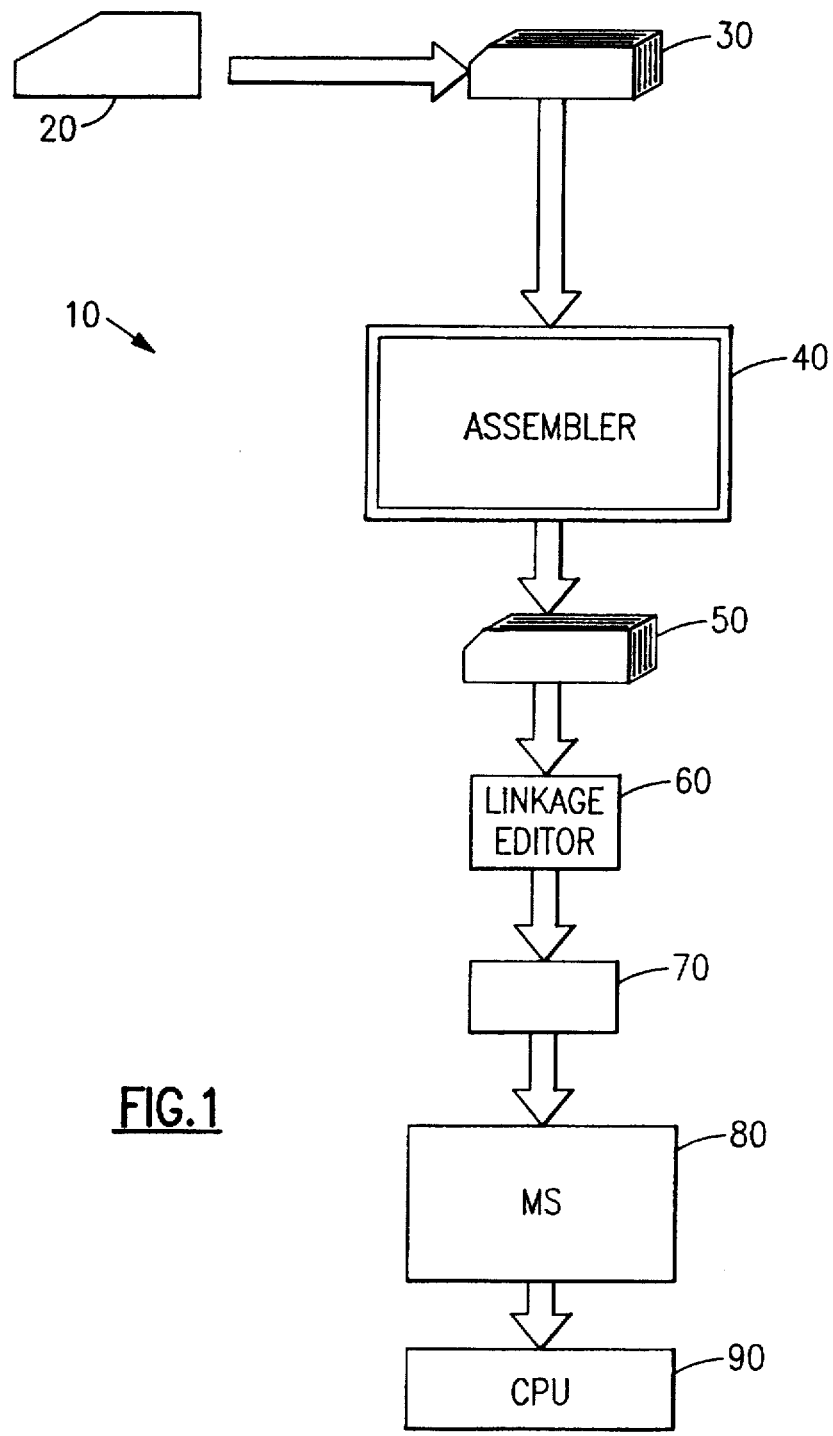
FIG. 1 shows an overview of a computer system.

FIG. 1 shows an overview of a data processing system 10. A programmer enters code in assembler language at a terminal 20 which is then stored in a source file 30 in memory. When the source file 30 is completed it is processed by an assembler 40 which produces an object module 50 in machine language. The object code in the object module 50 is used as an input to another processing program, the linkage editor 60, which in turn produces a load module 70. The load module 70 can be loaded into main storage 80 of the data processing system which then executes the program in a processor 90.

The assembler language is the symbolic programming language that lies closest to the machine language in form and content. It is made up of statements that represent instructions and/or comments. The instruction statements are the working part of the language and are divided into the following three groups:

1) Machine Instructions. These are symbolic representations of machine language instructions of the processor instruction set. The machine instructions for the IBM /390 Enterprise Systems Architecture are given in the IBM Manual SA22-7201-00 entitled *Principles of Operation* cited above.

2) Assembler Instructions. These are requests to the assembler program to perform certain operations during the assembly of a source module. Examples of such operations are defining data constants, defining the end of a source module or reserving main storage areas. Except for instructions that define constants, the assembler does not translate assembler instructions into object code.

3) Macro Instructions. These are requests to the assembler program to process a predefined sequence of code called a macro definition in a "pre-compile" step. The macro definition may be either stored in a library as explained later or may be defined at once at the beginning of the source code. The macro must be invoked by a "macro call" which may set the value of macro variables following the definition. From the macro definition, the assembler generates machine and assembler instructions which it then processes as if they were part of the original input in the source module. Macro definitions can be programmed by the user or may be pre-programmed into the assembler.

A description of the IBM /370 Assembler Language (which is essentially the same as the IBM /390 Assembler Language) is found in the IBM Manual GC33-4010, entitled *OS/VS-DOS/VSE-VM/370 Assembler Language* and in the book *Principles of Assembler Language Programming for the IBM 370* by Spotswood D. Stoddard, McGraw Hill, Inc., New York, 1985. The description of the /370 Assembler language from these publications is incorporated herein by reference.

Figure 2:
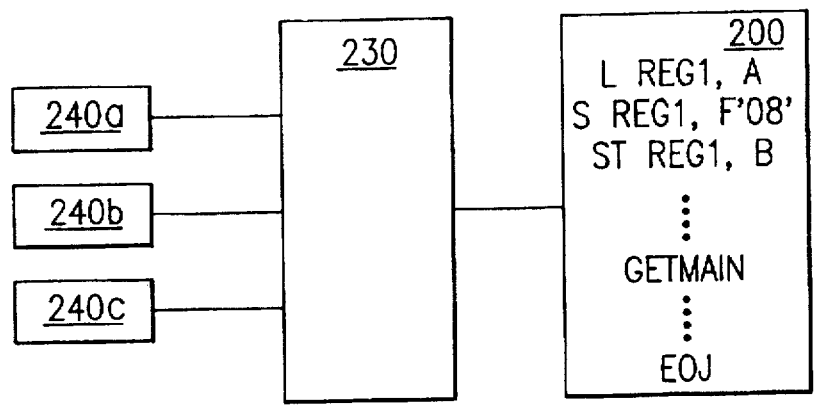
FIG. 2 shows an overview of the macro facility provided by the IBM S/390 Assembler Language.

An overview of the assembler 40 according to the current invention is shown in FIG. 2. The source code in assembler language is shown as source module 200. The source code shown within the block 200 on FIG. 2 is only exemplary to illustrate the invention and consists of the following statements:

| | |
|---|---|
| L REG1, A | Load register 1 with the contents of the memory location whose address is given by the variable A |
| S REG1; F'08' | Subtract 8 from the value stored in register 1 |
| ST REG1, B | Store the contents of register 1 into the memory location whose address is given by the variable B. |
| ... | (Further Assembler Statements) |
| GETMAIN | Macro instruction |
| ... | (Further Assembler Statements) |
| EOJ | Macro instruction |

The instructions L, S and ST are all machine instructions whose function is described in the above-referenced books. The instruction GETMAIN and EOJ are examples of a macro instruction whose function will be explained below.

Block 230 represents the macro facility supplied by the assembler language compiler. Full details of the macro facility are supplied in part IV, pages 237–376, of the IBM Book GC33-4010-5 as referenced above. The macro facility 230 allows the programmer to write a macro instruction (such as GETMAIN in the above example) in the source module 200 which then tells the assembler 40 to process a particular macro definition identified by GETMAIN.

The macro facility 230 is provided with a series of macro libraries 250a–c in which are stored the macros to which the assembler 40 has access. The macro libraries 240a–c can either be developed by local programmers or may be purchased from commercial vendors. They are accessed through the macro facility 230.

Figure 3:
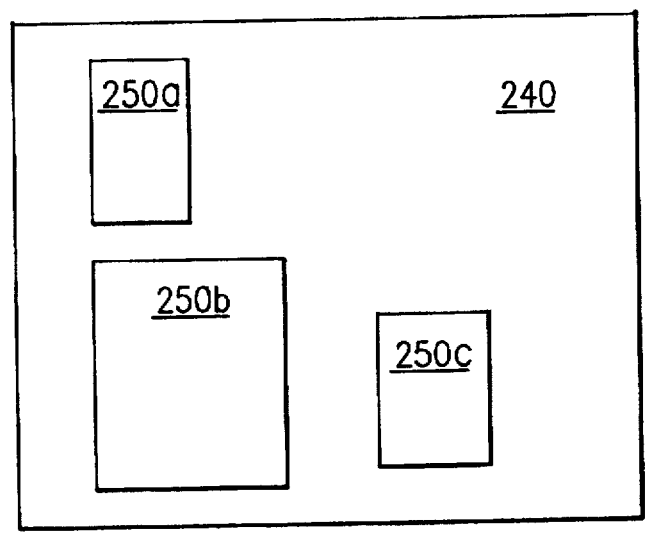
FIG. 3 shows the structure of one of the macro libraries in the macro facility.

FIG. 3 shows an example of one of the macro libraries 240. Within the macro library are stored a series of macro definitions 250a–c. The macro definitions 250 consist of a series of assembler language instructions which can be passed to the assembler 40 through the macro facility 230 when the macro 250 is called. This will be explained in more detail below.

Suppose now that the assembler 40 assembles the source code in the source code module 200. The role of the assembler 40 is, as described above, to produce object code in the object module 50. The assembler 40 carries out this task by analysing the statements of the source code in the source code module 200 and converting them into object code statements. The assembler 40 is able to do this directly for machine instructions and assembler instructions. However, when the assembler 40 encounters macro instructions, it must look for a macro definition 250 with the name indicated by the macro instruction, e.g. GETMAIN.

The assembler 40 recognises that a macro must be processed since the instruction that it encounters is neither a machine instruction nor an assembler instruction. It passes the name of the macro to the macro facility 230 which then looks through the macro libraries 240 to see whether a macro definition 250 with the same name is present in one of the libraries 240. If no macro definition 250 with the name is found, the macro facility 230 indicates this to the assembler 40 which then issues an error message indicating that either the requested macro definition 250 is not present or that a typing error has been made.

Assuming now that a macro definition 250 in one of the libraries 240 corresponding to the name passed by the assembler 40 to the macro facility 230 is found, then the macro facility passes the instruction statements which make up the macro definition 250 to the assembler 40, where the instruction statements are converted into object code. This is termed "expanding the macro".

Figures 4A, 4B:
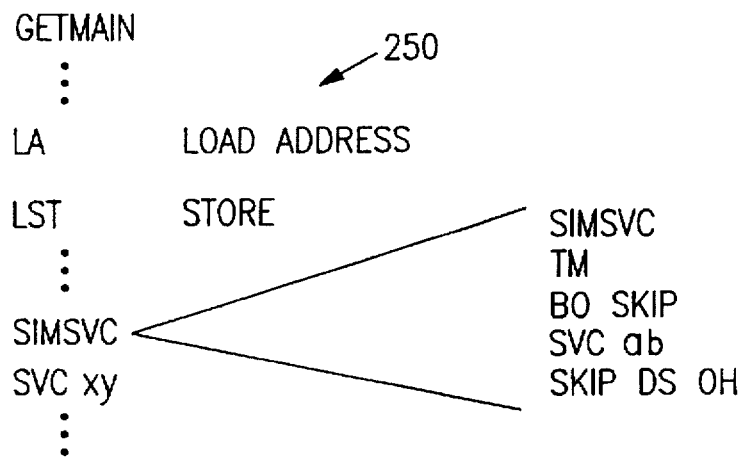
FIG. 4A shows exemplary code written in the assembler programming language.
FIG. 4B shows the macro definition for the SIMSVC macro.

An example of a macro definition 250 is given in FIG. 4A. This shows a macro definition 250 with the name GETMAIN. It consists of a series of instruction statements (missing ones being indicated by dotted lines) and includes the machine instructions LA and ST whose function is explained in the above-referenced *Principles of Operation*.

After more instruction statements (indicated by dotted lines), it will be seen that the macro definition 250 of FIG. 4A additionally includes two further instruction statements SIMSVC and SVC xy followed by further instruction statements also indicated by dotted lines. The SVC instruction is known as the supervisor call instruction and is another prior art machine instruction whose function will now be briefly explained.

Whenever a computer executing a program (in the form of a load module 70) encounters an SVC instruction at runtime, it interrupts the execution of the program and calls the so-called first level interrupt handler. The computer executing the program switches from the problem state to the supervisor state and the current program status word (PSW) and interrupt information such as the program status is saved. A new PSW is fetched from a known location within the memory 80. The new PSW points to a routine (the so-called first level interrupt handler) which takes the value of the variable xy. The value of the variable xy was previously saved as part of interrupt information and program status and accesses a hash table, known as an SVC table, using the value of the SVC code, i.e., the value of the variable xy, associated with the SVC machine instruction as the index.

Figure 5:
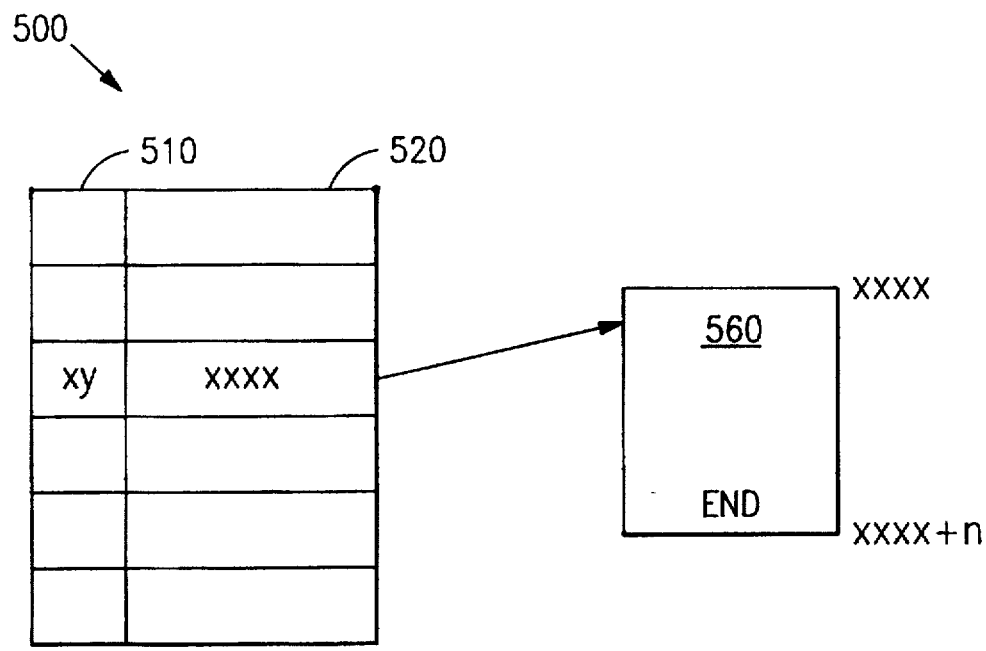
FIG. 5 shows an SVC table with an entry pointing to code stored in a memory location.

An example of an SVC table 500 is shown in FIG. 5. The SVC table 500 is essentially a two-dimensional array with a series of indices 510 and associated memory addresses 520. At the locations within the memory 80 specified by the memory addresses 520, code 560 is found to run the so-called supervisor service routines. The first level interrupt handler uses the value of the variable xy to find the address xxxx of a memory location at which is found the supervisor service routine code 560 which is to be executed. The code 560 is executed sequentially until the end of the code at a memory location with an address xxxx+n is reached. After the end of the code 560 is found, the supervisor recovers the original, stored PSW and the program status. The computer executes subsequent instructions from the program.

The instruction statement SIMSVC is another macro instruction. The instruction statements for the macro definition SIMSVC in the macro library 240 are shown in FIG. 4B. Although the macro is termed here SIMSVC, the terminology chosen is merely illustrative and other designations could be chosen.

It will be noted that the macro instruction SIMSVC is found within the GETMAIN macro definition as illustrated in FIG. 4A. The effect of this is that during the pre-compiling of the GETMAIN macro, i.e. when extracting the macro definition 250 from the macro library 240, the macro instruction SIMSVC will be recognised and the corresponding macro definition 250 also retrieved from the macro library 240.

The macro definition for the SIMSVC macro as shown in FIG. 4B consists of five instructions. The TM instruction tests the operating system of the environment in which the program is executing. If the operating system is MVS/ESA then the BO instruction instructs the computer to skip to the instruction labelled with the label SKIP DS 0H and executes the following SVC instruction, i.e. SVC xy. If the operating system is not MVS/ESA, e.g. VSE/ESA or VM/ESA, then the SVC instruction directly following the BO is executed, i.e. SVC ab as shown in FIG. 4A.

As mentioned above, the instruction statements from the macro 250 are passed to the assembler 40 where they are converted to object code and placed in the object module 50 and, after passing through the linkage editor 60, are converted to a load module 70 which can be run in the computer.

The load module 70 contains all of the machine and assembler instructions from the source code module 200 together with the expanded macro statements from the called macros 250. In the illustrative example, the load module 70 also includes the instructions from the expanded macro SIMSVC whose function will now be explained with reference to the flow diagram of FIG. 6.

Figure 6:
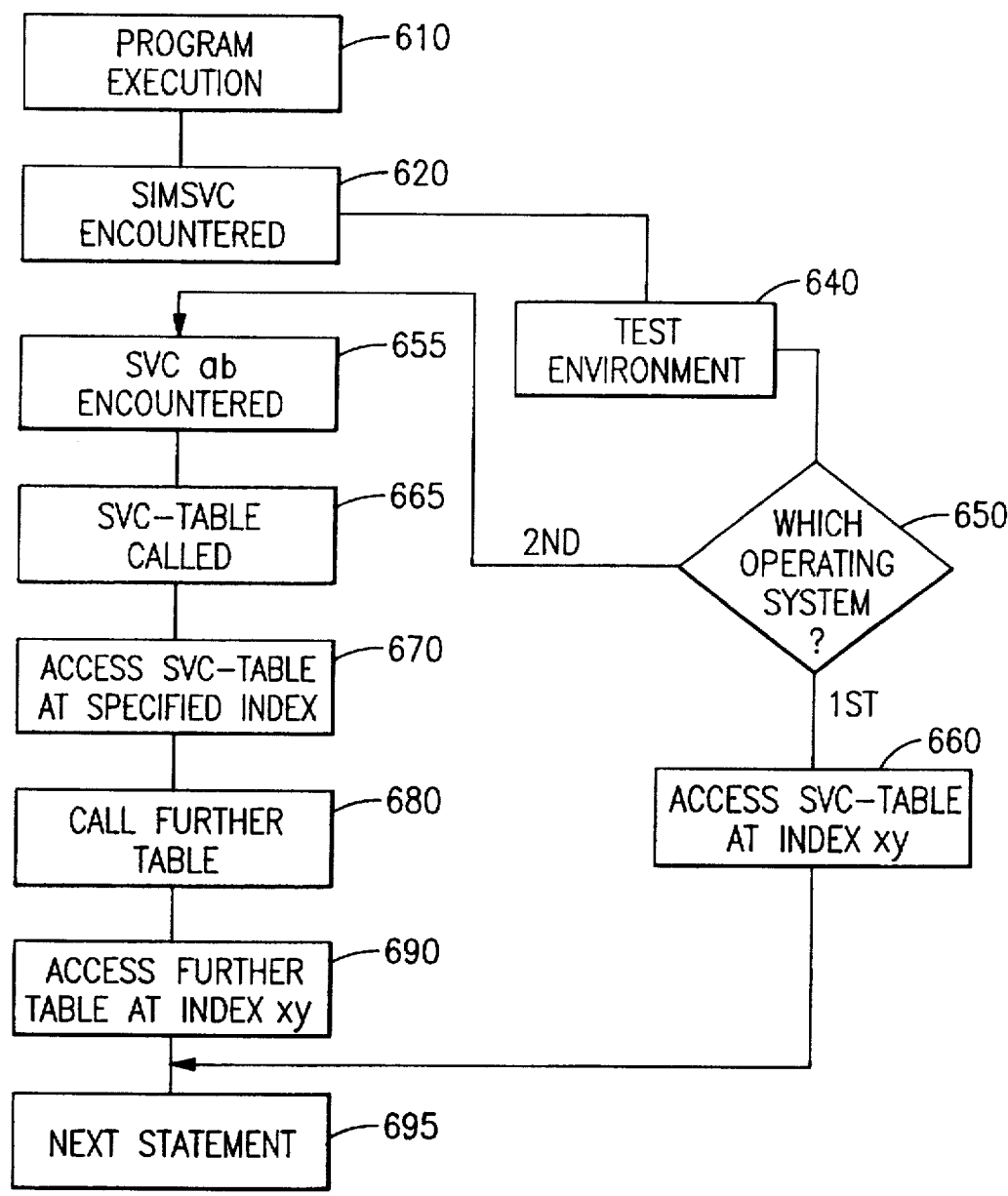
FIG. 6 is a flow diagram showing the operation of the invention.

In block 610 of FIG. 6, the computer is executing the load module 70 containing the source code converted into object code. Among the object code instructions encountered are the object code equivalents of the expanded SIMSVC macro as is shown in block 620. From the sample source code program of FIG. 4A it is known that the instruction statement to be encountered after the execution of the instruction statements from the expanded SIMSVC macro will be the machine instruction SVC xy whose function in prior art systems was explained above.

The effect of the SIMSVC instruction is shown in block 640. In block 640, the operating system environment in which the program is being executed is tested. This can be found by testing a value of a register in the memory 80 of the computer on which the program is running and is carried out by the assembler instruction TM as shown in FIG. 4B and described above.

If the test in block 640 indicates that the operating system environment is a first operating system environment (block 650), e.g. the IBM operating system VSE/ESA, then the execution of the SVC instruction continues as is known in the prior art and described above. In block 660, the SVC table 500 for the first operating system is accessed and the supervisor service routine code 560 is executed. After the execution of the code 560, the next object code instruction is executed (block 695).

Figure 7:
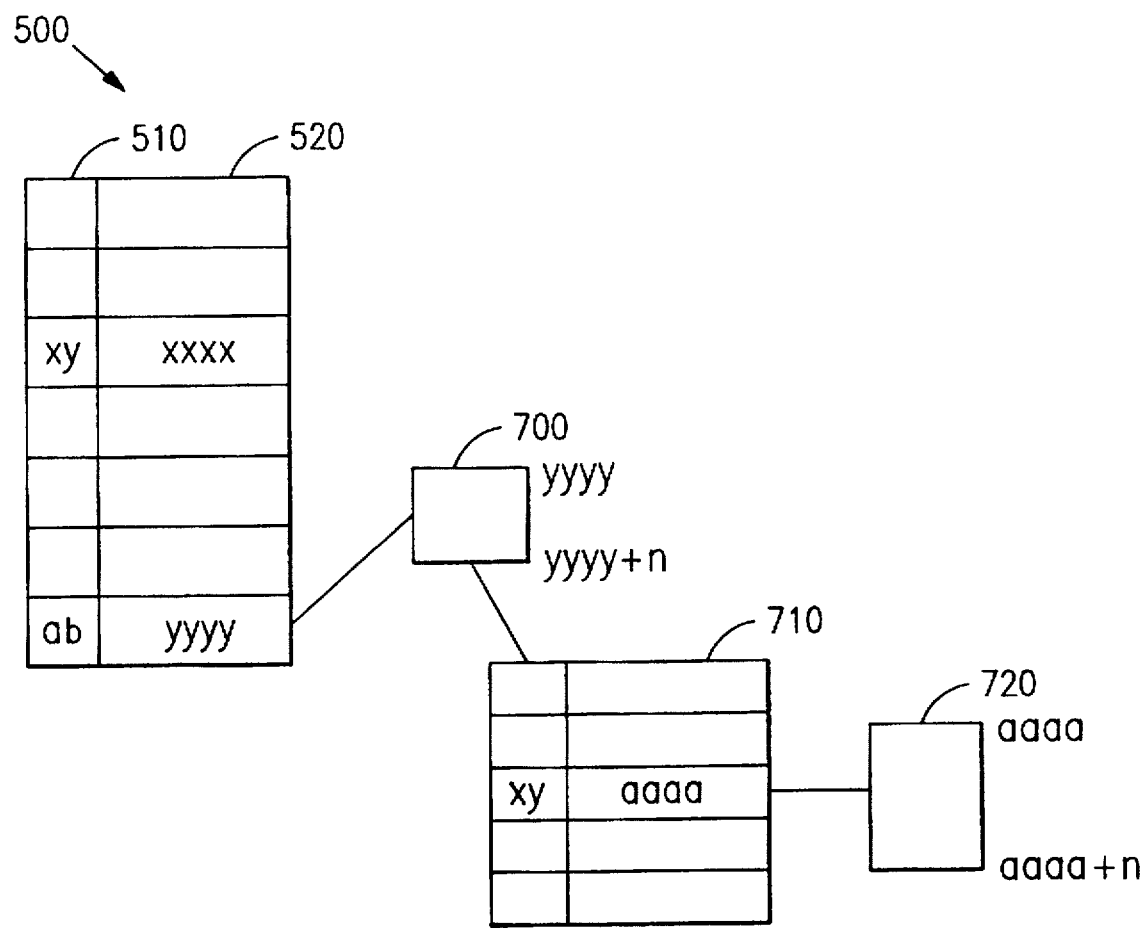
FIG. 7 shows the addition of a second hash table to the SVC table of FIG. 5.

Supposing, however, the test in block 640 indicated that the operating system environment was a second operating system environment (block 650), e.g. the IBM operating system MVS/ESA, then in block 665 the SVC instruction is executed. Referring to our example of FIG. 7, SVC instruction execution with a supervisor code of ab (block 655) will process the supervisor service routine 700 starting with address yyyy in memory. This new supervisor service routine 700 is a simulation routine responsible to process and simulate all those SVC instructions belonging to the second operating system environment. Of course SVC instruction ab is a new supervisor routine being part of the first operating system environment. To determine which of the simulated SVC instructions is to be executed the SVC ab logic will analyze the old PSW, being the current PSW at the time when SVC ab had been detected, to retrieve the address of the next instruction to be executed in problem state (refer to the above discussion of the first-level interrupt handler). This address pointing to the instruction SKIP DS 0H (refer to FIG. 4B) allows to determine by a simple address incrementation to locate the instruction SVC xy and thus allows to determine that the SVC service routine with index xy (SVC code) of the simulated second operating system environment is to be called next.

After exploitation of the old PSW's contents the instruction address of the next instruction to be executed in problem state (which is stored within the PSW) is modified to point to the instruction following the instruction SVC xy (FIG. 4A) and stored back into the old PSW.

To proceed with the description of FIG. 6, blocks 670 and 680 represent the usage of a further hash table 710—in effect the SVC table corresponding to the second operating system environment (i.e. MVS/ESA)—for retrieving based on the SVC code xy the address aaaa of the SVC service routine related to the SVC code xy. Address aaaa points to the actual SVC service code 720 which then will be executed (block 690). After the execution of the code 720, a return is made to the supervisor which restores the program status and reloads the saved PSW. Execution of the program continues from the instruction subsequent to the SVC xy instruction (refer to FIG. 4A).

Whilst in conjunction with the invention, it was stated that the first operating system environment could be the VSE/ESA operating system and the second operating system environment the MVS/ESA operating system, it will be clear to the person skilled in the art that the invention could equally well find application for further operating system environments, e.g. the AIX™ operating system environment or the UNIX operating system environment. In such a case it is necessary to choose the appropriate further hash table 710 corresponding to the chosen second operating system environment, i.e. the SVC table for this operating system environment.

Similarly it is possible that the further hash table 710 is not an SVC table for a known operating system environment. Rather the further hash table 710 is a special hash table developed for particular services.

In the embodiment of the invention described above, the SIMSVC instruction is described as immediately preceding the SVC instruction. It is possible, however, that the SIMSVC instruction could be placed at the beginning of the macro 50 and indicate that a check for the operating system environment (block 640) should be carried out before executing any of the SVC instructions in the macro 250.

One application for the invention is to introduce storage management routines into the IBM VSE/ESA operating system. The storage management routines have already been programmed for the IBM MVS/ESA operating system and are accessed by supervisor service routine code 720 by means of MVS supervisor call instruction SVC which uses the MVS SVC table 710 for accessing the supervisor service routine code 720 which performs the storage management. However, the SVC index 510 which is used in the MVS/ESA operating system to call the storage management routines is already occupied in the VSE/ESA operating system. Thus by means of the invention as described above, this limitation can be overcome and the MVS/ESA storage management routines directly accessed in the VSE/ESA operating system.

What is claimed is:

1. Data processing apparatus comprising:

a processor having a supervisor state and an operating system and including a first set of service routines comprising one or more service routines, said operating system controlling the operation of said data processing apparatus;

detection means for detecting whether a service routine requested by an executing program belongs to said first set of service routines or to a second set of service routines, said first set of service routines being part of a first operating system and said second set of service routines being part of a second operating system;

a memory for storing the service routines of said first and second sets at respective locations and for storing a first hash table accessible by said supervisor state for pointing to the memory locations of each of said first set of service routines and a second hash table accessible by said supervisor state for pointing to the memory locations of each of said second set of service routines; and table indicating means responsive to said detection means for indicating which of said hash tables is accessible in said supervisor state, said table indicating means indicating said first hash table if the requested service routine belongs to said first set of service routines and indicating said second hash table if the requested service routine belongs to said second set of service routines.

2. Apparatus according to claim 1 in which said table indicating means comprises an index into said first hash table.

3. Apparatus according to claim 1 further comprising:

program entry means for allowing a programmer to enter a program into said apparatus.

4. Apparatus according to claim 3 further comprising:

an assembler for assembling said program entered into said apparatus;

a macro facility accessible by said assembler; and a macro library accessible by said macro facility, said macro library containing lines of code which when executing in the processor control said table indicating means, said assembler including said lines of code in said program.

5. Apparatus according to claim 1 in which said table indicating means causes processing of a requested service routine of said second set of service routines by processing a simulation routine located in said first set of service routines, said simulation routine locating said requested service routine in said second set of service routines and processing said requested service routine.

6. A method for calling a requested service routine requested by an executing program, said requested service routine belonging to a first set of service routines or a second set of service routines for controlling the operation of a data processing system comprising a processor and a memory, said first set of service routines belonging to said first operating system and said second set of service routines belonging to said second operating system, wherein said data processing system stores in said memory a first and a second hash table to locate in said memory service routines of said first and said second set of service routines, said method comprising the steps of:

testing whether said first or said second operating system is controlling said executing program to determine whether said requested service routine is to be located using said first or second hash table;

using the indicated hash table to locate the requested service routine in said memory; and executing said requested service routine in said processor.

7. A method according to claim 6 wherein the first operating system is the VSE/ESA operating system and the second operating system is the MVS/ESA operating system.

8. A method according to claim 6 wherein said second set of service routines comprise storage management routines.

9. A method according to claim 6 wherein said step of using the indicated hash table comprises the substeps of:

if said first hash table has been indicated, locating said requested service routine using said first hash table;

if said second hash table has been indicated, processing a simulation routine that is a member of said first set of service routines and is locatable using said first hash table, said simulation routine locating said requested service routine in said second set of service routines.

10. A method according to claim 9 wherein said simulation routine is located by an index into said first hash table, said index being set when said testing step indicates that said requested service routine is to be located using said second hash table.

* * * * *